(12) United States Patent
Löhr et al.

(10) Patent No.: US 8,555,126 B2
(45) Date of Patent: Oct. 8, 2013

(54) ACTIVATION OF SEMI-PERSISTENT RESOURCE ALLOCATIONS IN A MOBILE COMMUNICATION NETWORK

(75) Inventors: Joachim Löhr, Langen (DE); Martin Feuersänger, Langen (DE); Alexander Golitschek Edler von Elbwart, Langen (DE)

(73) Assignee: Panasonic Corporation, Osaka (JP)

( * ) Notice: Subject to any disclaimer, the term of this patent is extended or adjusted under 35 U.S.C. 154(b) by 364 days.

(21) Appl. No.: 12/988,275

(22) PCT Filed: Mar. 16, 2009

(86) PCT No.: PCT/EP2009/001895
§ 371 (c)(1),
(2), (4) Date: Dec. 30, 2010

(87) PCT Pub. No.: WO2009/129897
PCT Pub. Date: Oct. 29, 2009

(65) Prior Publication Data
US 2011/0107169 A1  May 5, 2011

(30) Foreign Application Priority Data

Apr. 25, 2008 (EP) .................... 08008030

(51) Int. Cl.
*H04L 1/18* (2006.01)
*G08C 25/02* (2006.01)
(52) U.S. Cl.
USPC ............ 714/748; 714/758; 714/776; 714/751
(58) Field of Classification Search
USPC .................. 714/748–751, 776, 758
See application file for complete search history.

(56) References Cited

U.S. PATENT DOCUMENTS 7,551,589 B2 *  6/2009  Kim et al. ..................... 370/335
2006/0018268 A1 *  1/2006  Kakani et al. ................ 370/278

OTHER PUBLICATIONS

International Search Report dated Jun. 12, 2009.
3GPP TSG-RAN WG2 Meeting #61bis, "Indication of persistent allocation for UL," Nokia Corporation, et al., R2-081962, Mar. 31-Apr. 4, 2008, pp. 1-3.
3GPP TSG-RAN2 Meeting #58bis, "VoIP support in LTE," Samsung, R2-072462, Jun. 2007, pp. 1-5.
3GPP TSG RAN WG2 #61 bis, "Configuration for semi-persistent scheduling," Panasonic, R2-081575, Mar. 31-Apr. 4, 2008, pp. 1-4.

(Continued)

*Primary Examiner* — Guy Lamarre
(74) *Attorney, Agent, or Firm* — Dickinson Wright PLLC

(57) ABSTRACT

The invention relates to a method for allocating radio resources to a mobile terminal for data transmission in a mobile communication system as performed by a mobile terminal and a base station, respectively. Moreover, the invention relates to a mobile terminal and a base station to perform such method, as well as an implementation of the method in software. The invention further provides a mobile communication system in which radio resources are allocated to a mobile terminal for uplink transmission. In order to avoid false activation of a semi-persistent resource allocation the invention defines new conditions under which a mobile terminal activates a semi-persistent resource allocation. Unlike for example in prior-art systems, a mobile terminal only activates a semi-persistent resource allocation, if it can confirm the activation command received from the access network. Preferably, the activation command and its confirmation are resource assignments.

20 Claims, 5 Drawing Sheets

| UL | RB | TBS | FH | Cyclic shift | NDI | TPC | CQI | CRC |

(56) References Cited

OTHER PUBLICATIONS

3GPP TSG-RAN WG2 #61bis, "Effect of false positive Semi-Persistent grants," Qualcomm Europe, R2-081827, Mar. 31-Apr. 4, 2008, pp. 1-2.

3GPP TSG-RAN Meeting #26, "Proposed Study Item on Evolved UTRA and UTRAN," NTT DoCoMo, et al., RP-040461, Dec. 2004, pp. 1-5, p. 1, Line 21.

3GPP TR 25.912 V7.2.0, "Feasibility study for evolved Universal Terrestrial Radio Access (UTRA) and Universal Terrestrial Radio Access Network (UTRAN) (Release 7)," Jun. 2007, pp. 1-63, p. 1, Line 22.

3GPP TR 25.913 V7.3.0, "Requirements for Evolved UTRA (E-UTRA) and Evolved UTRAN (E-UTRAN) (Release 7)," Mar. 2006, pp. 1-18, p. 1, Line 27.

3GPP TS 36.212 V8.2.0, "Evolved Universal Terrestrial Radio Access (E-UTRA); Multiplexing and channel coding (Release 8)," Mar. 2008, pp. 1-38, p. 12, Line 4.

3GPP TS 36.300 V8.4.0, "Evolved Universal Terrestrial Radio Access (E-UTRA) and Evolved Universal Terrestrial Radio Access Network (E-UTRAN); Overall description; Stage 2 (Release 8)," Mar. 2008, pp. 1-125, p. 12, Line 27.

3GPP TS 36.321 V8.1.0, "Evolved Universal Terrestrial Radio Access (E-UTRA) Medium Access Control (MAC) protocol specification (Release 8)," Mar. 2008, pp. 1-30, p. 12, Line 29.

3GPP TSG-RAN WG1 Meeting #52, "Way forward on RV and NDI signaling," Panasonic, et al., R1-081126, Feb. 2008, pp. 1-5, p. 15, Line 2.

* cited by examiner

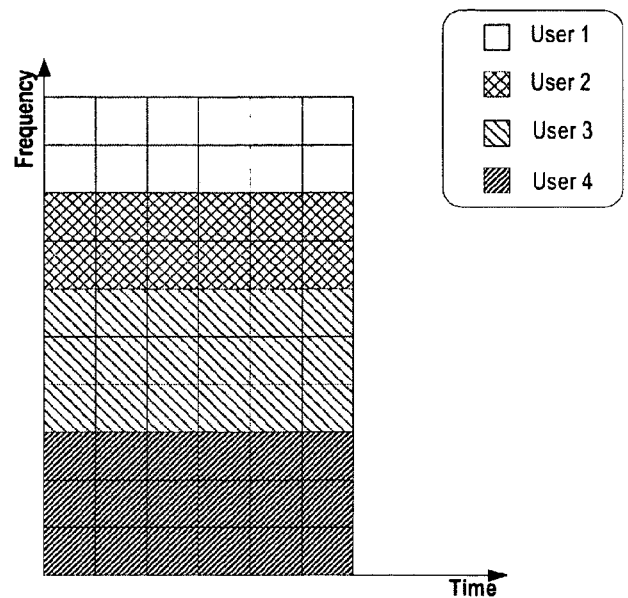
Fig. 3
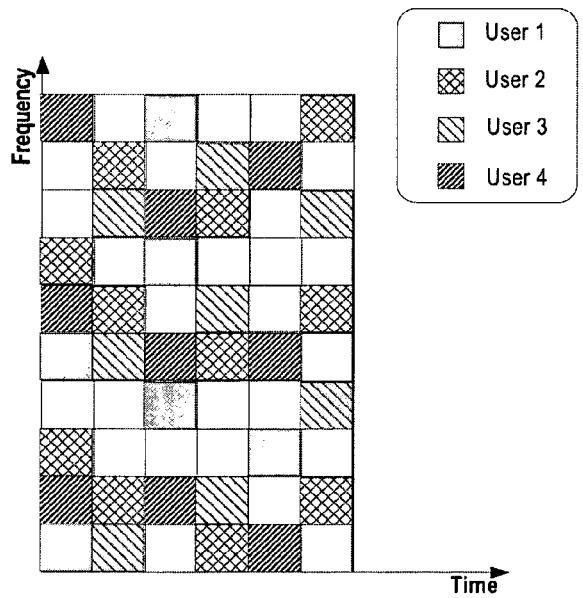
Fig. 4
| UL | RB | TBS | FH | Cyclic shift | NDI | TPC | CQI | CRC |
Fig. 5

ACTIVATION OF SEMI-PERSISTENT RESOURCE ALLOCATIONS IN A MOBILE COMMUNICATION NETWORK

FIELD OF THE INVENTION

The invention relates to a method for allocating radio resources to a mobile terminal for data transmission in a mobile communication system as performed by a mobile terminal and a base station, respectively. Moreover, the invention relates to a mobile terminal and a base station to perform such method, as well as an implementation of the method in software. The invention further provides a mobile communication system in which radio resources are allocated to a mobile terminal for uplink transmission.

TECHNICAL BACKGROUND

Long Term Evolution (LTE)

Third-generation mobile systems (3G) based on WCDMA (Wideband Code Division Multiple Access) radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In a longer time perspective it is, however, necessary to be prepared for further increasing user demands and an even tougher competition from new radio access technologies. To meet this challenge, 3GPP has initiated the study item Evolved UTRA and UTRAN (see 3GPP Tdoc. RP-040461, "Proposed Study Item on Evolved UTRA and UTRAN", and 3GPP TR 25.912: "Feasibility study for evolved Universal Terrestrial Radio Access (UTRA) and Universal Terrestrial Radio Access Network (UTRAN)", version 7.2.0, June 2007, available at http://www.3gpp.org and both being incorporated herein by reference), aiming at studying means to achieve additional substantial leaps in terms of service provisioning and cost reduction. As a basis for this work, 3GPP has concluded on a set of targets and requirements for this long-term evolution (LTE) (see 3GPP TR 25.913, "Requirements for Evolved UTRA and Evolved UTRAN", version 7.3.0, March 2006, available at http://www.3gpp.org, incorporated herein by reference) including for example:

Peak data rates exceeding 100 Mbps for the downlink direction and 50 Mbps for the uplink direction.
Mean user throughput improved by factors 2 and 3 for uplink and downlink respectively
Cell-edge user throughput improved by a factor 2 for uplink and downlink
Uplink and downlink spectrum efficiency improved by factors 2 and 3 respectively.
Significantly reduced control-plane latency.
Reduced cost for operator and end user.
Spectrum flexibility, enabling deployment in many different spectrum allocations.

The ability to provide high bit rates is a key measure for LTE. Multiple parallel data stream transmission to a single terminal, using multiple-input-multiple-output (MIMO) techniques, is one important component to reach this. Larger transmission bandwidth and at the same time flexible spectrum allocation are other pieces to consider when deciding what radio access technique to use. The choice of adaptive multi-layer OFDM, AML-OFDM, in downlink will not only facilitate to operate at different bandwidths in general but also large bandwidths for high data rates in particular. Varying spectrum allocations, ranging from 1.25 MHz to 20 MHz, are supported by allocating corresponding numbers of AML-OFDM subcarriers. Operation in both paired and unpaired spectrum is possible as both time-division and frequency-division duplex is supported by AML-OFDM.

LTE Architecture

The overall architecture is shown in FIG. 1 and a more detailed representation of the E-UTRAN architecture is given in FIG. 2. The E-UTRAN consists of base stations (referred to as eNode Bs or eNBs in the 3GPP terminology), providing the E-UTRA user plane (PDCP/RLC/MAC/PHY) and control plane (RRC) protocol terminations towards the mobile terminal (referred to as UE in the 3GPP terminology).

The eNodeB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated UL QoS, cell information broadcast, ciphering/deciphering of user and control plane data, and compression/decompression of DL/UL user plane packet headers.

The eNodeBs are interconnected with each other by means of the X2 interface. The eNodeBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state UEs, the SGW terminates the downlink data path and triggers paging when downlink data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS).

The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

OFDM with Frequency-Domain Adaptation

The AML-OFDM-based (AML-OFDM=Adaptive Milti-Layer-Orthorgonal Frequency Division Multiplex) downlink has a frequency structure based on a large number of individual sub-carriers with a spacing of 15 kHz. This frequency granularity facilitates to implement dual-mode UTRA/E-UTRA terminals. The ability to reach high bit rates is highly dependent on short delays in the system and a prerequisite for this is short sub-frame duration. Consequently, the LTE sub-frame duration is set as short as 1 ms in order to minimize the radio-interface latency. In order to handle different delay spreads and corresponding cell sizes with a modest overhead the OFDM cyclic prefix length can assume two different values. The shorter 4.7 ms cyclic prefix is enough to handle the delay spread for most unicast scenarios. With the longer cyclic prefix of 16.7 ms very large cells, up to and exceeding 120 km cell radius, with large amounts of time dispersion can be handled. In this case the length is extended by reducing the number of OFDM symbols in a sub-frame.

The basic principle of Orthogonal Frequency Division Multiplexing (OFDM) is to split the frequency band into a number of narrowband channels. Therefore, OFDM allows transmitting data on relatively flat parallel channels (subcarriers) even if the channel of the whole frequency band is frequency selective due to a multipath environment. Since the subcarriers experience different channel states, the capacities of the subcarriers vary and permit a transmission on each subcarrier with a distinct data-rate. Hence, subcarrier-wise (frequency domain) Link Adaptation (LA) by means of Adaptive Modulation and Coding (AMC) increases the radio efficiency by transmitting different data-rates over the subcarriers. OFDMA allows multiple users to transmit simultaneously on the different subcarriers per OFDM symbol. Since the probability that all users experience a deep fade in a particular subcarrier is very low, it can be assured that subcarriers are assigned to the users who see good channel gains on the corresponding sub-carriers. When allocating resources in the downlink to different users in a cell, the scheduler takes information on the channel status experienced by the users for the subcarriers into account. The control information signaled by the users, i.e. CQI, allows the scheduler to exploit the multi-user diversity, thereby increasing the spectral efficiency.

Localized vs. Distributed Mode

Two different resource allocation methods can be distinguished upon when considering a radio access scheme that distribute available frequency spectrum among different users as in OFDMA. The first allocation mode or "localized mode" tries to benefit fully from frequency scheduling gain by allocating the subcarriers on which a specific UE experiences the best radio channel conditions. Since this scheduling mode requires associated signaling (resource allocation signaling, CQI in uplink), this mode would be best suited for non-real time, high data rate oriented services. In the localized resource allocation mode a user is allocated continuous blocks of subcarriers.

The second resource allocation mode or "distributed mode" relies on the frequency diversity effect to achieve transmission robustness by allocating resources that are scattered over time and frequency grid. The fundamental difference with localized mode is that the resource allocation algorithm does not try to allocate the physical resources based on some knowledge on the reception quality at the receiver but select more or less randomly the resource it allocates to a particular UE. This distributed resource allocation method seems to be best suited for real-time services as less associated signaling (no fast CQI, no fast allocation signaling) relative to "localized mode" is required.

The two different resource allocation methods are shown in FIG. 3 and FIG. 4 for an OFDMA based radio access scheme. As can be seen from FIG. 3, which depicts the localized transmission mode, the localized mode is characterized by the transmitted signal having a continuous spectrum that occupies a part of the total available spectrum. Different symbol rates (corresponding to different data rates) of the transmitted signal imply different bandwidths (time/frequency bins) of a localized signal. On the other hand, as can be seen from FIG. 4, the distributed mode is characterized by the transmitted signal having a non-continuous spectrum that is distributed over more or less the entire system bandwidth (time/frequency bins).

Hybrid ARQ Schemes

A common technique for error detection and correction in packet transmission systems over unreliable channels is called hybrid Automatic Repeat request (HARD). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet. Generally (and throughout this document) the transmission of additional information is called "retransmission (of a packet)", although this retransmission does not necessarily mean a transmission of the same encoded information, but could also mean the transmission of any information belonging to the packet (e.g. additional redundancy information).

Depending on the information (generally code-bits/symbols), of which the transmission is composed, and depending on how the receiver processes the information, the following Hybrid ARQ schemes are defined:

In Type I HARQ schemes, the information of the encoded packet is discarded and a retransmission is requested, if the receiver fails to decode a packet correctly. This implies that all transmissions are decoded separately. Generally, retransmissions contain identical information (code-bits/symbols) to the initial transmission.

In Type II HARQ schemes, a retransmission is requested, if the receiver fails to decode a packet correctly, where the receiver stores the information of the (erroneous received) encoded packet as soft information (soft-bits/symbols). This implies that a soft-buffer is required at the receiver. Retransmissions can be composed out of identical, partly identical or non-identical information (code-bits/symbols) according to the same packet as earlier transmissions. When receiving a retransmission the receiver combines the stored information from the soft-buffer and the currently received information and tries to decode the packet based on the combined information. (The receiver can also try to decode the transmission individually, however generally performance increases when combining transmissions.) The combining of transmissions refers to so-called soft-combining, where multiple received code-bits/symbols are likelihood combined and solely received code-bits/symbols are code combined. Common methods for soft-combining are Maximum Ratio Combining (MRC) of received modulation symbols and log-likelihood-ratio (LLR) combining (LLR combing only works for code-bits).

Type II schemes are more sophisticated than Type I schemes, since the probability for correct reception of a packet increases with receive retransmissions. This increase comes at the cost of a required hybrid ARQ soft-buffer at the receiver. This scheme can be used to perform dynamic link adaptation by controlling the amount of information to be retransmitted. E.g. if the receiver detects that decoding has been "almost" successful, it can request only a small piece of information for the next retransmission (smaller number of code-bits/symbols than in previous transmission) to be transmitted. In this case it might happen that it is even theoretically not possible to decode the packet correctly by only considering this retransmission by itself (non-self-decodable retransmissions).

Type III HARQ schemes may be considered a subset of Type II schemes: In addition to the requirements of a Type II scheme each transmission in a Type III scheme must be self-decodable.

HARQ Protocol Operation for Unicast Data Transmissions

A common technique for error detection and correction in packet transmission systems over unreliable channels is called hybrid Automatic Repeat request (HARQ). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet In LTE there are two levels of re-transmissions for providing reliability, namely, HARQ at the MAC layer and outer ARQ at the RLC layer. The outer ARQ is required to handle residual errors that are not corrected by HARQ that is kept simple by the use of a single bit error-feedback mechanism, i.e. ACK/NACK. An N-process stop-and-wait HARQ is employed that has asynchronous re-transmissions in the downlink and synchronous re-transmissions in the uplink.

Synchronous HARQ means that the re-transmissions of HARQ blocks occur at pre-defined periodic intervals. Hence, no explicit signaling is required to indicate to the receiver the retransmission schedule.

Asynchronous HARQ offers the flexibility of scheduling re-transmissions based on air interface conditions. In this case some identification of the HARQ process needs to be signaled in order to allow for a correct combing and protocol operation. In 3GPP LTE systems, HARQ operations with eight processes is used. The HARQ protocol operation for downlink data transmission will be similar or even identical to HSDPA.

In uplink HARQ protocol operation there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions). In case of a synchronous non-adaptive retransmission the retransmission will use the same parameters as the previous uplink transmission, i.e. the retransmission will be signaled on the same physical channel resources, respectively uses the same modulation scheme/transport format.

Since synchronous adaptive retransmission are explicitly scheduled via PDCCH, the eNodeB has the possibility to change certain parameters for the retransmission. A retransmission could be for example scheduled on a different frequency resource in order to avoid fragmentation in the uplink, or eNodeB could change the modulation scheme or alternatively indicate to the user equipment what redundancy version to use for the retransmission. It should be noted that the HARQ feedback (ACK/NACK) and PDCCH signaling occurs at the same timing. Therefore the user equipment only needs to check once whether a synchronous non-adaptive retransmission is triggered (i.e. only a NACK is received) or whether eNode B requests a synchronous adaptive retransmission (i.e. PDCCH is signaled).

L1/L2 Control Signaling

In order to inform the scheduled users about their allocation status, transport format and other data related information (e.g. HARQ) L1/L2 control signaling is transmitted on the downlink along with the data. This control signaling is multiplexed with the downlink data in a sub-frame (assuming that the user allocation can change from sub-frame to sub-frame). Here, it should be noted, that user allocation might also be performed on a TTI (Transmission Time Interval) basis, where the TTI length is a multiple of the sub-frames. The TTI length may be fixed in a service area for all users, may be different for different users, or may even by dynamic for each user. Generally, then the L1/2 control signaling needs only be transmitted once per TTI.

The L1/L2 control signaling is transmitted on the Physical Downlink Control Channel (PDCCH). It should be noted that assignments for uplink data transmissions, uplink (scheduling) grants, are also transmitted on the PDCCH.

Generally, the information sent on the L1/L2 control signaling may be separated into the two categories, Shared Control Information and Dedicated Control Information:

Shared Control Information (SCI) Carrying Cat 1 Information

The SCI part of the L1/L2 control signaling contains information related to the resource allocation (indication). The SCI typically contains the following information:
  User identity, indicating the user which is allocated
  RB allocation information, indicating the resources (Resource Blocks, RBs) on which a user is allocated. Note, that the number of RBs on which a user is allocated can be dynamic.
  Duration of assignment (optional), if an assignment over multiple sub-frames (or TTIs) is possible Depending on the setup of other channels and the setup of the Dedicated Control Information (DCI), the SCI may additionally contain information such as ACK/NACK for uplink transmission, uplink scheduling information, information on the DCI (resource, MCS, etc.).

Dedicated Control Information (DCI) Carrying Cat 2/3 Information

The DCI part of the L1/L2 control signaling contains information related to the transmission format (Cat 2) of the data transmitted to a scheduled user indicated by Cat 1. Moreover, in case of application of (hybrid) ARQ it carries HARQ (Cat 3) information. The DCI needs only to be decoded by the user scheduled according to Cat 1.

The DCI typically contains information on:
  Cat 2: Modulation scheme, transport-block (payload) size (or coding rate), MIMO related information, etc. (Note, either the transport-block (or payload size) or the code rate can be signaled. In any case these parameters can be calculated from each other by using the modulation scheme information and the resource information (number of allocated RBs)).
  Cat 3: HARQ related information, e.g. hybrid ARQ process number, redundancy version, retransmission sequence number.

Details on L1/L2 Control Signaling Information

For downlink data transmissions L1/L2 control signaling is transmitted on a separate physical channel (PDCCH). This L1/L2 control signaling typically contains information on:
  The physical resource(s) on which the data is transmitted (e.g. subcarriers or subcarrier blocks in case of OFDM, codes in case of CDMA). This information allows the UE (receiver) to identify the resources on which the data is transmitted.
  The transport format, which is used for the transmission. This can be the transport block size of the data (payload size, information bits size), the MCS (Modulation and Coding Scheme) level, the Spectral Efficiency, the code rate, etc. This information (usually together with the resource allocation) allows the user equipment (receiver) to identify the information bit size, the modulation scheme and the code rate in order to start the demodulation, the de-rate-matching and the decoding process. In some cases the modulation scheme maybe signaled explicitly.

Hybrid ARQ (HARQ) information:
Process number: Allows the user equipment to identify the Hybrid ARQ process on which the data is mapped
Sequence number or new data indicator: Allows the user equipment to identify if the transmission is a new packet or a retransmitted packet
Redundancy and/or constellation version: Tells the user equipment, which hybrid ARQ redundancy version is used (required for de-rate-matching) and/or which modulation constellation version is used (required for demodulation)

UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:

The physical resource(s) on which the user equipment should transmit the data (e.g. subcarriers or subcarrier blocks in case of OFDM, codes in case of CDMA).

The transport Format, the UE should use for the transmission. This can be the transport block size of the data (payload size, information bits size), the MCS (Modulation and Coding Scheme) level, the Spectral Efficiency, the code rate, etc. This information (usually together with the resource allocation) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:
Process number: Tells the user equipment from which Hybrid ARQ process it should pick the data
Sequence number or new data indicator: Tells the user equipment to transmit a new packet or to retransmit a packet
Redundancy and/or constellation version: Tells the user equipment, which hybrid ARQ redundancy version to use (required for rate-matching) and/or which modulation constellation version to use (required for modulation)

UE Identity (UE ID): Tells which user equipment should transmit data. In typical implementations this information is used to mask the CRC of the L1/L2 control signaling in order to prevent other user equipments to read this information.

There are several different flavors how to exactly transmit the information pieces mentioned above. Moreover, the L1/L2 control information may also contain additional information or may omit some of the information. E.g.:

HARQ process number may not be needed in case of a synchronous HARQ protocol

A redundancy and/or constellation version may not be needed if Chase Combining is used (always the same redundancy and/or constellation version) or if the sequence of redundancy and/or constellation versions is pre defined.

Power control information may be additionally included in the control signaling

MIMO related control information, such as e.g. precoding, may be additionally included in the control signaling.

In case of multi-codeword MIMO transmission transport format and/or HARQ information for multiple code words may be included For uplink resource assignments signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e. the RV info is embedded in the transport format (TF) field. The TF respectively MCS field has for example a size of 5 bits, which corresponds to 32 entries. 3 TF/MCS table entries are reserved for indicating redundancy versions 1, 2 or 3. The remaining MCS table entries are used to signal the MCS level (TBS) implicitly indicating RV0. The TBS/RV signaling for uplink assignments on PDCCH is shown in FIG. 4. An exemplary PDCCH for uplink assignments as defined in 3GPP TS 36.212. "Evolved Universal Terrestrial Radio Access (E-UTRA); Multiplexing and channel coding (Release 8)". version 8.2.0, March 2008 (available at http://www.3gpp.org and incorporated herein by reference) is shown in FIG. 5. The size of the CRC field of the PDCCH is 16 bits.

For the meaning of the fields FH, Cyclic shift and CQI it is referred to 3GPP 36.212 for further details.

Semi-Persistent Scheduling

In the downlink and uplink, the scheduling eNodeB dynamically allocates resources to user equipments at each transmission time interval via the L1/L2 control channel(s) (PDCCH) where the user equipments are addressed via their specific C-RNTIs. As already mentioned before the CRC of an PDCCH is masked with the addressed user equipment's C-RNTI (so-called dynamic PDCCH). Only a user equipment with a matching C-RNTI can decode the PDCCH content correctly, i.e. the CRC check is positive. This kind of PDCCH signaling is also referred to as dynamic (scheduling) grant. A user equipment monitors at each transmission time interval the L1/L2 control channel(s) for a dynamic grant in order to find a possible allocation (downlink and uplink) it is assigned to.

In addition, E-UTRAN can allocate uplink/downlink resources for initial HARQ transmissions persistently. When required, retransmissions are explicitly signaled via the L1/L2 control channel(s). Since retransmissions are scheduled, this kind of operation is referred to as semi-persistent scheduling (SPS), i.e. resources are allocated to the user equipment on a semi-persistent basis (semi-persistent resource allocation). The benefit is that PDCCH resources for initial HARQ transmissions are saved. For details on semi-persistent scheduling, see 3GPP TS 36.300, "Evolved Universal Terrestrial Radio Access (E-UTRA) and Evolved Universal Terrestrial Radio Access Network (E-UTRAN); Overall description; Stage 2 (Release 8)", version 8.4.0, March 2008 or 3GPP TS 36.321 "Evolved Universal Terrestrial Radio Access (E-UTRA); Medium Access Control (MAC) protocol specification (Release 8)", version 8.1.0, March 2008, both available at http://www.3gpp.org and incorporated herein by reference.

One example for a service, which might be scheduled using semi-persistent scheduling is Voice over IP (VoIP). Every 20 ms a VoIP packet is generated at the codec during a talk-spurt. Therefore eNodeB could allocated uplink or respectively downlink resource persistently every 20 ms, which could be then used for the transmission of Voice over IP packets. In general, semi-persistent scheduling is beneficial for services with a predictable traffic behavior, i.e. constant bit rate, packet arrival time is periodic.

The user equipment also monitors the PDCCHs in a sub-frame where it has been allocated resources for an initial transmission persistently. A dynamic (scheduling) grant, i.e. PDCCH with a C-RNTI-masked CRC, can override a semi-persistent resource allocation. In case the user equipment finds its C-RNTI on the L1/L2 control channel(s) in the sub-frames where the sub-frame has a semi-persistent resource assigned, this L1/L2 control channel allocation overrides the semi-persistent resource allocation for that transmission time interval and the user equipment does follow the dynamic grant. When sub-frame doesn't find a dynamic grant it will transmit/receive according to the semi-persistent resource allocation.

The configuration of semi-persistent scheduling is done by RRC signaling. For example the periodicity, i.e. PS_PERIOD, of the persistent allocation is signaled within Radio resource Control (RRC) signaling. The activation of a persistent allocation and also the exact timing as well as the physical resources and transport format parameters are sent via PDCCH signaling. Once semi-persistent scheduling is activated, the user equipment follows the semi-persistent resource allocation according to the activation SPS PDCCH every PS_PERIOD. Essentially the user equipment stores the SPS activation PDCCH content and follows the PDCCH with the signaled periodicity.

In order to distinguish a dynamic PDCCH from a PDCCH, which activates semi-persistent scheduling, i.e. also referred to as SPS activation PDCCH, a separate identity is introduced. Basically, the CRC of a SPS activation PDCCH is masked with this additional identity which is in the following referred to as SPS C-RNTI. The size of the SPS C-RNTI is also 16 bits, same as the normal C-RNTI. Furthermore the SPS C-RNTI is also user equipment-specific, i.e. each user equipment configured for semi-persistent scheduling is allocated a unique SPS C-RNTI.

In case a user equipment detects a semi-persistent resource allocation is activated by a corresponding SPS PDCCH, the user equipment will store the PDCCH content (i.e. the semi-persistent resource assignment) and apply it every semi-persistent scheduling interval, i.e. periodicity signaled via RRC. As already mentioned, a dynamic allocation, i.e. signaled on dynamic PDCCH, is only a "one-time allocation".

Similar to the activation of semi-persistent scheduling, the eNodeB also can deactivate semi-persistent scheduling. There are several options how a semi-persistent scheduling de-allocation can be signaled. One option would be to use PDCCH signaling, i.e. SPS PDCCH indicating a zero size resource allocation, another option would be to use MAC control signaling.

When the user equipment monitors the PDCCH for assignments, there is always a certain probability (false alarm rate), that the user equipment falsely considers a PDCCH destined to itself. Essentially, situations may occur where the CRC check of the PDCCH is correct even though the PDCCH was not intended for this user equipment, i.e. CRC passes even though there is a UE identifier (UE ID) mismatch (unintended user). These so-called "false alarm" might occur, if the two effects of transmission errors caused by the radio channel and UE ID mismatch cancel each other. The probability of a falsely positive decoded PDCH depends on the CRC length. The longer the CRC length, the lower the probability that a CRC-protected message is erroneously decoded correctly. With the CRC size of 16 bit the false alarm probability would be 1.5e-05. It should be noted that due to the introduction of a separate identity for the discrimination of dynamic PDCCHs (dynamic C-RNTI) and SPS PDCCHs (SPS C-RNTI), false alarms are even more frequent.

On the first glance the probability might appear to be sufficiently low, however the impacts of a falsely positive decoded semi-persistent scheduling PDCCH are quite severe as will be outlined in the following. Since the effects are in particular for uplink persistent allocation critical, the main focus lies on falsely activated uplink semi-persistent resource allocations.

For uplink resource assignments signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e. the RV info is embedded in the transport format (TF) field. The TF respectively MCS field has for example a size of 5 bits, which corresponds to 32 entries. 3 TF/MCS table entries are reserved for indicating redundancy versions 1, 2 or 3. The remaining MCS table entries are used to signal the MCS level (TBS) implicitly indicating RV0. The TBS/RV signaling for uplink assignments on PDCCH is shown in 3GPP TSG-RAN WG1 Meeting #52, Tdoc. R1-081126, "Way forward on RV and NDI signaling", February 2008 (available at http://www.3gpp.org and incorporated herein by reference), in particular slide 5. An exemplary PDCCH for uplink assignments as defined in 3GPP TS 36.212, "Evolved Universal Terrestrial Radio Access (E-UTRA); Multiplexing and channel coding (Release 8)". version 8.2.0, March 2008 (available at http://www.3gpp.org and incorporated herein by reference) is shown in FIG. 5. The size of the CRC field of the PDCCH is 16 bits.

Essentially as a consequence of a false activation of a semi-persistent resource allocation for the uplink, a talk spurt can be lost completely or partially several times during a normal voice call. In addition, a false activation of a semi-persistent resource allocation for the uplink causes unnecessary interference to the system.

SUMMARY OF THE INVENTION

One object of the invention is to overcome at the above mentioned drawbacks of a false activation of a semi-persistent resource allocation.

The object is solved by the subject matter of the independent claims. Advantageous embodiments of the invention are subject matters of the dependent claims.

One main aspect of the invention is to reduce the probability of having a "false alarm", i.e. a false activation of a semi-persistent resource allocation by defining new conditions under which a mobile terminal activates a semi-persistent resource allocation. Unlike for example in prior-art systems as described in the Technical Background section above, a mobile terminal only activates a semi-persistent resource allocation, if it can confirm the activation command received from the access network.

For example, when using resource assignment messages to activate a semi-persistent resource allocation, the mobile terminal may only activate the semi-persistent resource allocation, if it receives two resource assignments for uplink transmissions according to the semi-persistent resource allocation (where one resource assignment may be considered to "confirm" the other resource assignment). The two resource assignments for activating the semi-persistent resource allocation could be for example signalled in the same or in different sub-frames.

One embodiment of the invention relates to a method for allocating radio resources to a mobile terminal for uplink transmission in a mobile communication system. In this method comprising the mobile terminal receives downlink physical control channel resources and activates a semi-persistent resource allocation only, if control information comprised on the received downlink physical control channel resources comprises two resource assignments for uplink transmission for the mobile terminal (i.e. the two resource assignments are both destined to the mobile terminal) and indicate an activation of the semi-persistent resource allocation.

In one further, more specific embodiment of the invention, the mobile terminal is transmitting, in response to receiving the first resource assignment of the two resource assignments, an initial transmission of an uplink protocol data unit on an uplink shared channel according to the semi-persistent resource allocation (to a base station) using a synchronous HARQ protocol. Further, the mobile terminal monitors the downlink physical control channel resources for a HARQ feedback message for the initial transmission of the protocol data unit and for the second resource assignment. When receiving the second resource assignment of the two resource assignments on the downlink physical control channel resources, the second resource assignment is indicating whether the initial transmission of the protocol data unit has been successfully decoded or not and is confirming the activation of the semi-persistent resource allocation.

Furthermore, in a variation of the embodiment, the mobile terminal further stores the first resource assignment upon reception, and may discard the stored first resource assignment, if no second resource assignment for activating the semi-persistent resource allocation is received at the expected timing, i.e. the activation of the semi-persistent resource allocation as indicated by the first resource assignment is not confirmed by a corresponding second resource assignment.

In another variation, the second resource assignment may be equal in content to the first resource assignment except for indicating a redundancy version for a retransmission of the protocol data unit to be sent by the mobile terminal instead of a transport format of the protocol data unit indicated in the fist resource assignment, if the initial transmission of the protocol data unit on the uplink has not been decoded successfully.

Moreover, the second resource assignment may be equal in content to the first resource assignment except for a new data indicator comprised in the resource assignments being toggled to indicate a successful decoding of the initial transmission of the protocol data unit, if the initial transmission of the protocol data unit on the uplink has been decoded successfully.

In a variation of this embodiment, the second resource assignment of the two resource assignments is received by the mobile terminal with a time offset equal to one HARQ round-trip time relative to the first resource assignment of the two resource assignments. When considering the exemplary embodiment discussed above, where the mobile terminal transmits an initial transmission of a protocol data unit already upon receiving the first resource assignment, the second resource assignment to confirm the activation of the semi-persistent resource allocation may be sent by the base station on the physical downlink control channel resources at the timing when the mobile terminal expects the HARQ feedback for the protocol data unit in view of using a synchronous HARQ protocol.

According to another embodiment of the invention, the two resource assignments each comprise a CRC field for checking the integrity of the resource assignment and the CRC field is masked with a mobile terminal identifier assigned to the mobile terminal for identification in signalling procedures related to semi-persistent resource allocations. This type of resource assignment is also referred to as a semi-persistent resource assignment herein (in contrast to a dynamic resource assignment which is referring to a resource assignment the CRC field of which has been masked with a mobile terminal identifier assigned to the mobile terminal for identification in signalling procedures related to dynamic resource allocations). For example, such mobile terminal identifier could be for example a RNTI (Radio Network Temporary Identifier) assigned to the mobile terminal for identification in signalling procedures related to semi-persistent resource allocations.

As indicated above, the two resource assignments for activating the semi-persistent resource allocation could also be signalled in the same sub-frame. Accordingly, in another embodiment of the invention the mobile terminal receives a sub-frame of which the downlink physical control channel resources comprise the two resource assignments for uplink transmission. The resource assignment may be for example a semi-persistent resource assignment and the second resource assignment may be for example a dynamic resource assignment. Alternatively, also both resource assignments could be a semi-persistent resource assignment.

In case of using a semi-persistent resource assignment and a dynamic resource assignment for the activation of the semi-persistent resource allocation, the semi-persistent resource allocation may be for example activated by the mobile terminal only, if:
   the CRC field of the semi-persistent resource assignment is masked with a mobile terminal identifier assigned to the mobile terminal for identification in signalling procedures related to semi-persistent resource allocations, and
   the CRC field of the dynamic resource assignment is masked with a mobile terminal identifier assigned to the mobile terminal for identification in signalling procedures related to dynamic resource allocations.

In an alternative implementation, it may be even further demanded that the information comprised in the semi-persistent and dynamic resource assignment is identical or only differing in the resource allocation size indicated by the respective resource assignment.

In one further variation of the embodiment, the resource allocation size indicated in the dynamic resource assignment is set to zero, while the resource allocation size indicated in the semi-persistent resource assignment is indicating the resource allocation size to be used for uplink transmission according to the semi-persistent resource allocation.

In another variation of the embodiment, the mobile terminal is transmitting uplink data according to the semi-persistent resource assignment only if both, the semi-persistent resource assignment and dynamic resource assignment are destined to the mobile terminal.

In another embodiment of the invention, the mobile terminal may first check whether the control information in a sub-frame comprises a dynamic resource assignment dynamically assigning an uplink radio resource to the mobile terminal for uplink transmission. Only if there is no dynamic resource assignment in the control information destined to the mobile terminal, the mobile terminal will further check whether the downlink control information in the sub-frame comprises a semi-persistent resource assignment for uplink transmissions. Accordingly, in this embodiment, the dynamic resource assignments have higher priority than semi-persistent resource assignments.

As indicated above, the periodicity of the semi-persistent resource allocation may be configured via signalling between the mobile terminal and the radio access network. Accordingly, in another embodiment of the invention the mobile terminal may receive RRC signalling indicating the periodicity of transmissions to be transmitted according to the semi-persistent resource allocation and may store the resource allocation information of the first and/or second resource assignment for execution of the semi-persistent resource allocation. The mobile terminal may thus transmit uplink data in accordance with the stored resource allocation information and the periodicity of the semi-persistent resource allocation.

A further embodiment of the invention relates to the operation of a network entity or element in the radio access network of a mobile communication system that is scheduling the mobile node. In typical modern communication systems, this network element is a base station. The invention thus further relates to a method for allocating radio resources to a mobile terminal for uplink transmission in a mobile communication system where the base station in the radio access network of the mobile communication system generates control information for activating a semi-persistent resource allocation of the mobile terminal, wherein the control information comprises two resource assignments for uplink transmission, wherein the two resource assignments are destined to the mobile terminal which is to activate of the semi-persistent resource allocation, and maps the control information to downlink physical control channel resources. Upon having mapped the control information to the downlink physical control channel resources, the base station transmits the downlink physical control channel resources comprising the control information.

As indicated previously, it is advantage if the second resource assignment of the two resource assignments is transmitted with a time offset equal to one HARQ round-trip time relative to the first resource assignment of the two resource assignments. Basically, in this exemplary embodiment, the base station may control the activation of the semi-persistent resource allocation to the mobile terminal after having sent the first resource assignment. If it decides that no semi-persistent scheduling should be used (e.g. due to a change in the scheduling decision), after having sent the first resource assignment, the base station may select whether or not to send the second resource assignment to confirm the semi-persistent resource allocation.

In a variation of this embodiment, the mobile terminal may provisionally activate the semi-persistent resource allocation after receiving the first semi-persistent resource assignment (i.e. may treat the fist semi-persistent resource assignment as a dynamic grant until the semi-persistent resource allocation is confirmed). Accordingly, in response to receiving the first resource assignment of the two resource assignments, the base station receives an initial transmission of an uplink protocol data unit on an uplink shared channel according to the resource allocation using a synchronous HARQ protocol from the mobile terminal. The base station tries to decode the protocol data unit and further transmits on downlink physical control channel resources a HARQ feedback message for the initial transmission of the protocol data unit. The second resource assignment is indicating whether the initial transmission of the protocol data unit has been successfully decoded by the base station and is confirming the activation of the semi-persistent resource allocation.

In a further variation, the base station transmits the two resource assignments for uplink transmission in the same sub-frame. The first resource assignment is thereby a semi-persistent resource assignment and second resource assignment being a dynamic resource assignment. Furthermore, the base station detects whether the mobile terminal has activated the semi-persistent resource allocation by receiving an uplink transmission of a protocol data unit on the radio resources allocated to the mobile terminal by the resource assignments.

Another embodiment of the invention relates to a mobile terminal for use in a mobile communication system. The mobile terminal comprises a receiver unit for receiving downlink physical control channel resources and a processing unit for activating a semi-persistent resource allocation only, if the control information of the downlink physical control channel resources comprises two resource assignments for uplink transmission, wherein the two resource assignments being destined to the mobile terminal and (together) indicate an activation of the semi-persistent resource allocation.

In addition, the mobile terminal may be equipped with further means to perform the steps of the method for allocating radio resources to a mobile terminal for uplink transmission in a mobile communication system according to one of the different embodiments and their variations described herein.

Further, the invention according to another embodiment is providing a base station for use in a radio access system of a mobile communication system. The base station comprises a processing unit for generating control information for activating a semi-persistent resource allocation of the mobile terminal. The base station's processing unit further generates control information comprising two resource assignments for uplink transmission, and to destine the resource assignments to a mobile terminal which is to activate of the semi-persistent resource allocation. Moreover, the base station includes a mapping unit for mapping the control information to downlink physical control channel resources, and a transmitter unit for transmitting the downlink physical control channel resources comprising the control information.

According to another embodiment of the invention, the base station further comprises means to perform the steps of the method for allocating radio resources to a mobile terminal for uplink transmission in a mobile communication system according to one of the different embodiments and their variations described herein.

Further, an embodiment of the invention provides a mobile communication system comprising a mobile station and a base station according to one of the different embodiments described herein.

Another aspect of the invention is the realization of the invention in software. The invention according to a further embodiment further relates to a computer-readable medium storing instruction that, when executed by a processor of a mobile terminal, cause the mobile terminal to receive downlink physical control channel resources, and to activate a semi-persistent resource allocation only, if the control information of the downlink physical control channel resources comprises two resource assignments for uplink transmission, wherein the two resource assignments being destined to the mobile terminal and indicate an activation of the semi-persistent resource allocation.

The computer readable medium may optionally store further instructions that, when executed by a processor of a mobile terminal, cause the mobile station to perform the steps of the method for allocating radio resources to a mobile terminal for uplink transmission in a mobile communication system according to one of the different embodiments and their variations described herein.

Concerning the software implementation on a base station, another embodiment of the invention relates to a computer readable medium storing instruction that, when executed by a processor of a base station, cause the base station to generate control information for activating a semi-persistent resource allocation of the mobile terminal, wherein the control information comprises two resource assignments for uplink transmission, wherein the two resource assignments are destined to the mobile terminal which is to activate of the semi-persistent resource allocation, to map the control information to downlink physical control channel resources, and to transmit the downlink physical control channel resources comprising the control information.

The computer readable medium may optionally store further instructions that, when executed by a processor of a base station, cause the base station to perform the steps of the method for allocating radio resources to a mobile terminal for uplink transmission in a mobile communication system according to one of the different embodiments and their variations described herein.

BRIEF DESCRIPTION OF THE FIGURES

In the following, the invention is described in more detail in reference to the attached figures and drawings. Similar or corresponding details in the figures are marked with the same reference numerals.

FIG. 3 shows an exemplary allocation of radio resources of an OFDM channel in localized transmission mode, FIG. 4 shows an exemplary allocation of radio resources of an OFDM channel in distributed transmission mode, FIG. 5 shows an exemplary format of a resource assignment message (PDCCH) for allocating uplink resources to a mobile terminal.

DETAILED DESCRIPTION OF THE INVENTION

Figure 1:
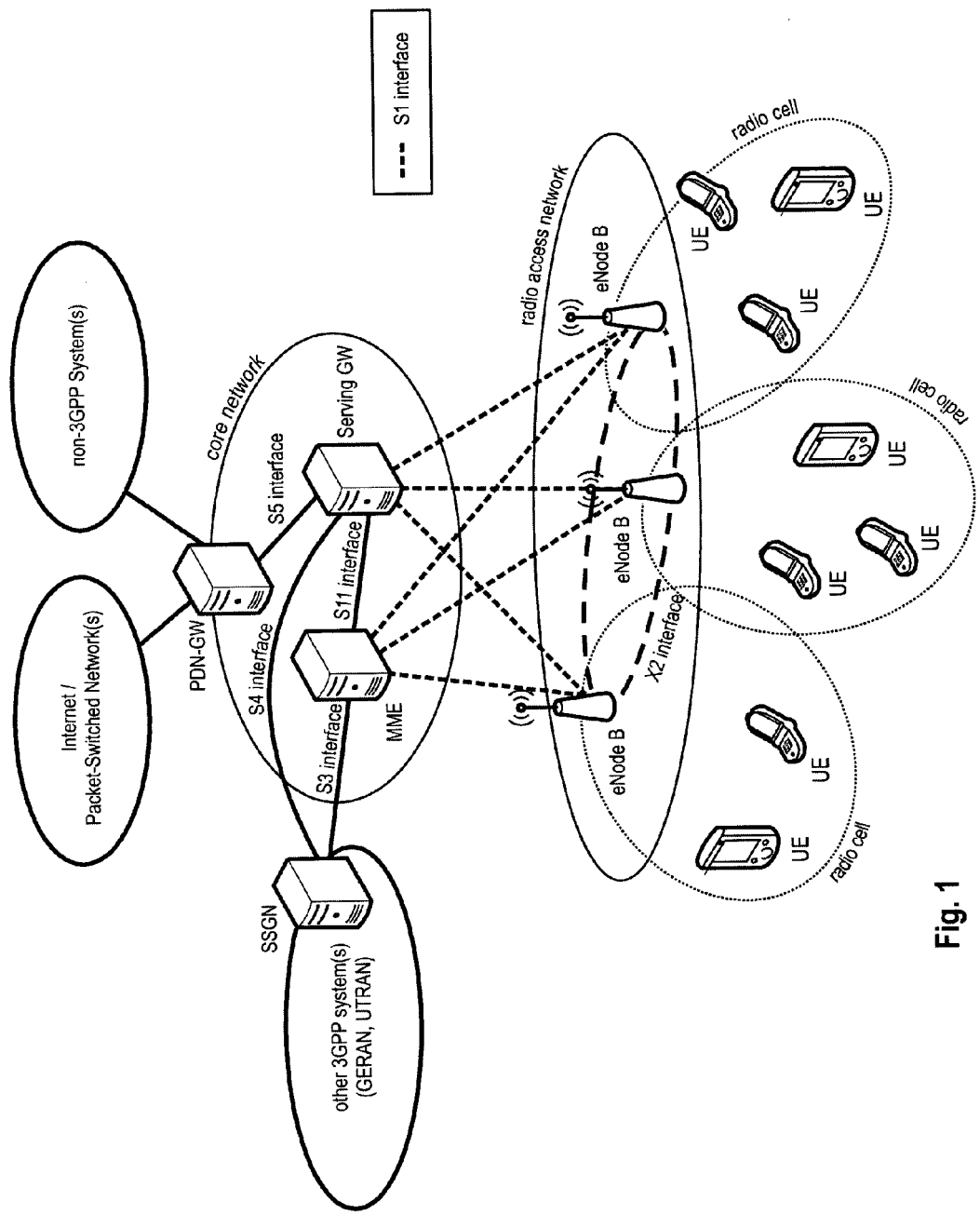
FIG. 1 shows an exemplary high level architecture of a 3GPP LTE system.
Figure 2:
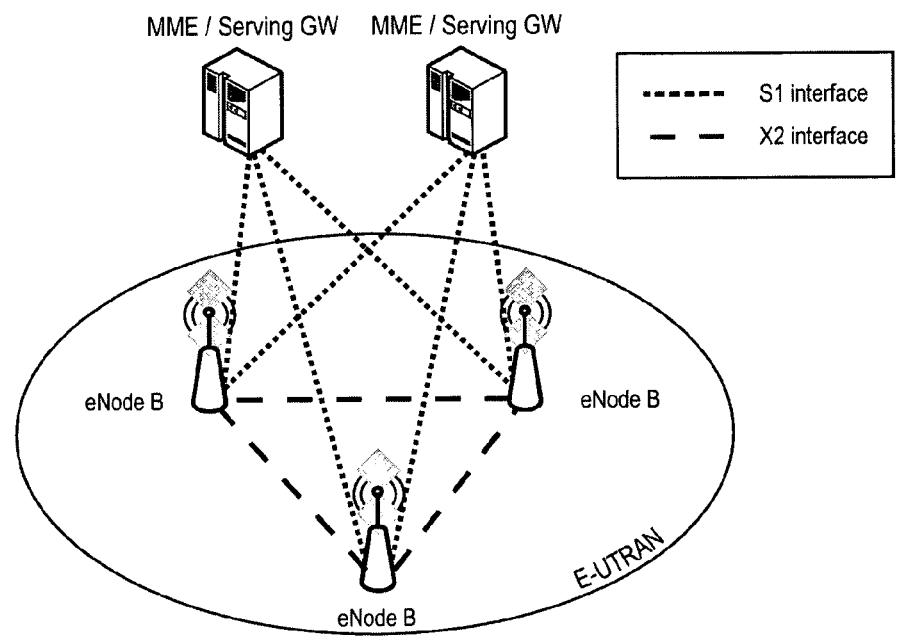
FIG. 2 shows an exemplary overview of the E-UTRAN of the high level architecture of a 3GPP LTE system in FIG. 1.

The following paragraphs will describe various embodiments of the invention. For exemplary purposes only, most of the embodiments are outlined in relation to an (evolved) communication system according to the SAE/LTE discussed in the Technical Background section above. It should be noted that the invention may be advantageously used for example in connection with a mobile communication system such as the SAE/LTE communication system previously described or in connection with multi-carrier systems such as OFDM-based systems, but the invention is not limited to its use in this particular exemplary communication networks.

One main aspect of the invention is to suggest an activation mechanism for semi-persistent resource allocations for uplink transmissions. However, it should be recognized that the invention may also be utilized for a semi-persistent scheduling of downlink transmissions. According to this main aspect, the invention suggests to activate a semi-persistent resource allocation, if a first "activation command" for a semi-persistent resource allocation provided via the PDCCH is confirmed by a second resource assignment on the PDCCH allocating resources.

As discussed in the Technical Background section, the "activation commands" may for example implemented in form of a resource assignment message (also referred to a (resource) assignment) destined to a mobile terminal (or user equipment when using the 3GPP terminology) may be used for the activation of a semi-persistent resource allocation of the mobile terminal.

In principle, there are two alternative implementations of this main aspect of the invention suggested herein. According to one alternative implementation, the activation command and its confirmation are transmitted on physical downlink control channel resources within two different sub-frames, preferably spaced by an offset corresponding to one HARQ roundtrip time, i.e. at the retransmission timing. According to the other alternative, the activation command and its confirmation are transmitted on physical downlink control channel resources within a single sub-frame. In both alternatives, only if the activation command and a confirmation are received by the mobile terminal for the semi-persistent resource allocation, same is activated. In one exemplary embodiment, the activation command as well as the confirmation thereof may be realized using resource assignments transmitted on the physical downlink control channel resources.

The physical downlink control channel resources relate to physical resources (e.g. a number of resource blocks) within one or more sub-frames of a physical downlink channel that are dedicated to include control signaling (including the activation command and confirmation of the semi-persistent resource allocation). In this connection, it may be assumed that each sub-frame includes some physical resources (resource blocks) that are dedicated for control signaling, while the remaining resource blocks are dedicated for user data transmission. For example in 3GPP LTE system the first two or three OFDM symbols of the whole system bandwidth of a sub-frame may be used as physical control channel resources, whereas the remaining OFDM symbols are used for physical downlink data channel, i.e. time division multiplex (TDM) between control signaling and user data. In one exemplary embodiment specifically relating to a 3GPP LTE system, the L1/L2 control channels, respectively PDCCHs, of different user equipments are carried on the physical downlink control channel resources.

Similar to the 3GPP based system discussed in the Technical Background section, it may be assumed for exemplary purposed only that the semi-persistent resource allocation/semi-persistent scheduling means that the mobile terminal is allocated physical resources on an uplink (or downlink) channel on which it may periodically transmit (receive) data. The periodicity of the transmissions may be for example configured via radio resource control, e.g. the RRC protocol prior to the activation of the semi-persistent scheduling. The transport format and physical channel resources (e.g. resource blocks) on the physical channel for the uplink (downlink) transmissions at the given periodicity is provided to the mobile terminal by means of a resource assignment, i.e. uplink or downlink (resource) assignment (also referred to a uplink or downlink resource assignment) that is transmitted by a scheduling entity of the radio access network, typically a base station (or eNodeB when using the 3GPP terminology). The resource assignment (for uplink) may be for example correspond to the one illustrated in FIG. 5. Hence, the periodicity of the transmission, the transport format and the physical channel resources may be considered to constitute a semi-persistent resource allocation.

As the main aspect of the invention is the activation of the semi-persistent scheduling/resource allocation it is not essential how the mechanism for configuring the periodicity of the transmissions according to a semi-persistent resource allocation is implemented. Essentially, it is assumed that the mobile terminal is aware of this periodicity, e.g. due to having received a corresponding signaling message as discussed above.

Furthermore, it should be noted that according to the invention, the uplink data may be transmitted using a synchronous HARQ protocol in the uplink, as outlined in the Technical Background section. Synchronous HARQ protocol means that retransmissions are sent at a known timing relative the initial transmission of a protocol data packet, but the TF/MCS and the resource blocks for the retransmission may vary from the initial/previous transmission of the protocol data unit (adaptive sychronous retransmission). In other words, the available HARQ processes are severed periodically so that transmissions for one HARQ process occur periodically. Furthermore, also the HARQ feedback (sent on the PHICH in LTE) may be transmitted with a constant time offset relative to the HARQ processes, so that the mobile terminal is aware of the sub-frame that is to provide the HARQ feedback (i.e. a PHICH for the mobile terminal is included in the sub-frame). Accordingly, the mobile terminal is receiving the physical downlink control channel resources of the sub-frame to receive the HARQ feedback. If an initial transmission of a protocol data unit (e.g. MAC PDU) on the uplink has not been decoded successfully at the base station, the HARQ feedback on the PHICH may be a NACK and the physical downlink control channel resources further comprises a resource allocation for the retransmission ("retransmission grant") on a PDCCH destined to the mobile terminal in case of an adaptive retransmission. In case of a non-adaptive retransmission only a NACK is signaled on the PHICH. If an initial transmission of a protocol data unit (e.g. MAC PDU) on the uplink has been decoded successfully at the base station, the HARQ feedback on the PHICH is a ACK and the physical downlink control channel resources may further comprise a resource allocation for the initial transmission of the next MAC PDU to be transmitted with the respective HARQ process ("initial grant") on a PDCCH destined to the mobile terminal. In the latter case the NDI flag in the resource allocation is toggled.

In the following, the invention will be described in further detail with respect to a 3GPP LTE system as discussed in the Technical Background section. It should be noted that the PDCCH channel in LTE may be considered a resource grant or assignment channel dedicated to a user (or group of users) by means of masking the CRC field with the appropriate identifier, as described in the Technical Background section. Accordingly, the term "receiving a PDCCH" should be understood as a mobile terminal receiving a resource assignment (for uplink or downlink) destined to the mobile terminal (by masking the CRC with a UE ID of the mobile terminal) via a PDCCH. Similarly, the term SPS UL PDCCH as used frequently in the following denotes an uplink assignment for semi-persistent resource allocation of a mobile terminal. A SPS UL PDCCH comprises a CRC field masked with a SPS C-RNTI of the mobile terminal. Similarly, the term dynamic UL PDCCH refers to an uplink assignment for dynamically assigning an uplink resource to the mobile terminal. A dynamic UL PDCCH comprises a CRC field masked with a C-RNTI of the mobile terminal. A similar definition is used for the downlink (DL) assignment (SPS DL PDCCH and dynamic DL PDCCH).

In order to avoid a false activation of an uplink semi-persistent resource allocation, according to one aspect of the invention, the eNodeB (i.e. a base station) sends two SPS UL PDCCHs to the mobile terminal (i.e. mobile terminal). Only after having received two SPS UL PDCCHs a mobile terminal assumes that an uplink semi-persistent resource allocation has been activated by base station and acts accordingly, i.e. transmits on the assigned uplink resource every semi-persistent scheduling interval. By sending two SPS UL PDCCHs for the activation the CRC length is basically doubled from 16 bit to 32 bit. Therefore the false alarm rate is reduced to 2.25e-10, which guarantees sufficient reliability against false alarms.

Figure 6:
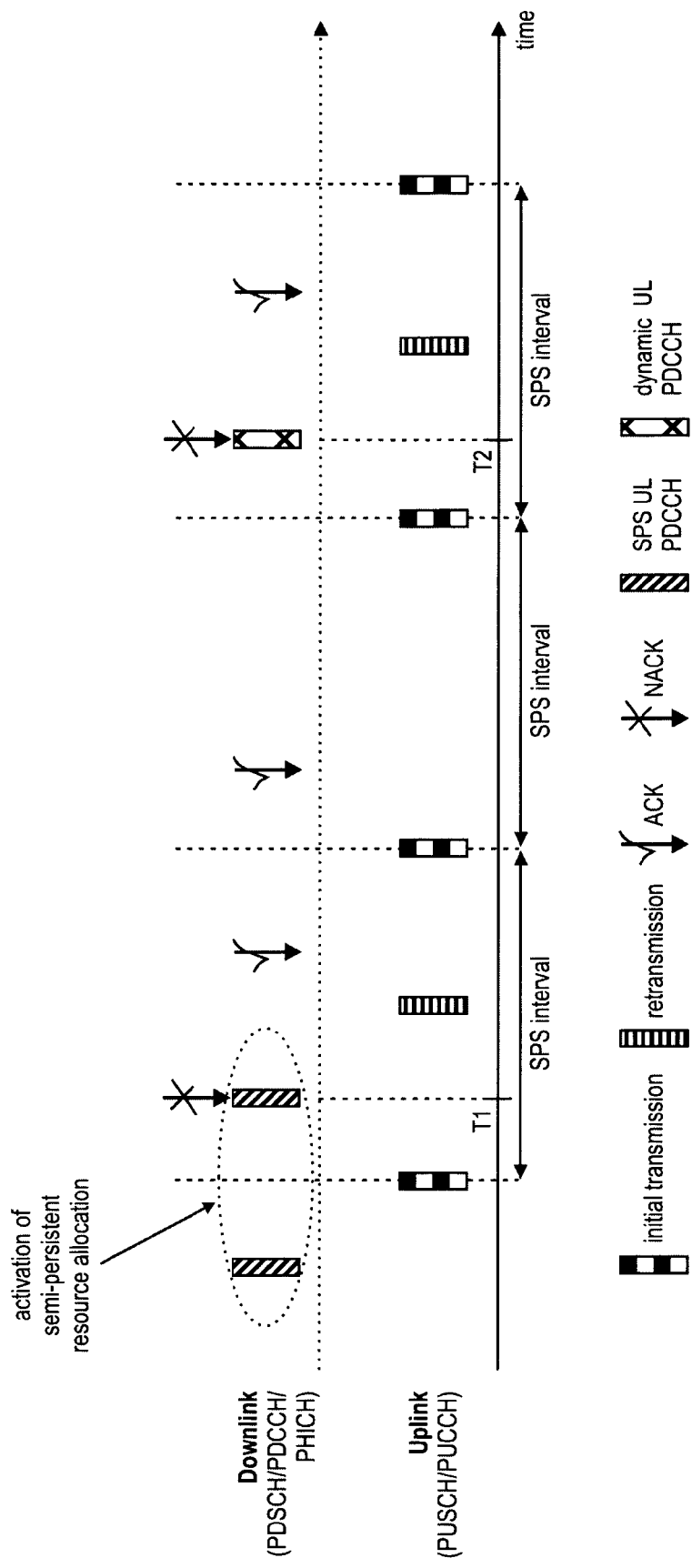
FIG. 6 shows an exemplary signaling procedure for activating an uplink semi-persistent resource allocation according to an exemplary embodiment of the invention.

In one more specific embodiment of the invention a special timing of the second SPS UL PDCCH, which essentially confirms the first SPS UL PDCCH and hence activation of the semi-persistent resource allocation is chosen. The transmission of the second SPS PDCCH with this special timing allows avoiding an increase of the mobile terminal complexity when using the invention. This is achieved by mandating that the second SPS UL PDCCH, confirming the activation of the semi-persistent resource allocation, is signaled (exactly) one HARQ roundtrip time (RTT) later than the first SPS UL PDCCH. The concept of the present invention is shown in FIG. 6. In other words, the second PDCCH is included in the same sub-frame, where the mobile terminal is expecting the transmission of HARQ feedback information on a PHICH according to the synchronous uplink HARQ protocol. Accordingly, the sub-frame includes the PHICH with an ACK/NACK for an initial transmission and the second SPS UL PDCCH for the mobile terminal confirming the activation of the semi-persistent resource allocation.

According to an embodiment of the invention, the activation procedure for activating the semi-persistent resource allocation may be designed as will be outlined in the following with respect to FIG. 6. FIG. 6 shows an exemplary signaling procedure for activating an uplink semi-persistent resource allocation.

For instance, a mobile station may have requested resources for transmission on the uplink (e.g. by sending a scheduling request via the Physical Uplink Control CHannel PUCCH). A base station sends a first SPS UL PDCCH to a mobile terminal on the downlink. Upon reception of a first SPS UL PDCCH, the mobile terminal stores the content of the SPS UL PDCCH and transmits an uplink transmission (initial transmission of a PDU) according the uplink assignment of the SPS UL PDCCH. The mobile terminal may for example transmit the uplink data via a Physical Uplink Shared Channel (PUSCH). Moreover, the service of which uplink data is to be sent using the semi-persistent resource allocation may be for example a service with a predictable traffic behavior, i.e. constant bit rate, packet arrival time is periodic, such as VoIP.

Upon having received the first SPS UL PDCCH the mobile terminal assumes at this moment not yet the activation of a semi-persistent uplink resource allocation (although a SPS UL PDCCH has been received) but only a one-time uplink resource allocation similar to a dynamic UL PDCCH. One HARQ RTT after having received the first SPS UL PDCCH (at time instance T1), the mobile terminal monitors the physical downlink control channel resources in a sub-frame for a PHICH providing the HARQ feedback for the initial transmission of the protocol data unit and for another PDCCH for potential (re)transmissions grants. Since a synchronous HARQ protocol with adaptive retransmissions is used for the transmission on the uplink, the timing (i.e. sub-frame) for the potential uplink (re)transmissions PDCCHs is fixed. In case the mobile terminal receives at this timing (T1) a second SPS UL PDCCH, the activation of uplink semi-persistent scheduling is confirmed and the mobile terminal will apply the stored PDCCH content (from the first SPS UL PDCCH) periodically, i.e. every semi-persistent interval (SPS interval).

In case mobile terminal doesn't receive a second UL SPS PDCCH at time instance T1, the mobile terminal discards the stored values and assumes that no uplink semi-persistent scheduling was activated. From mobile terminal point of view the monitoring for the second confirming SPS UL PDCCH is the normal UL HARQ operation, thus implying no extra complexity. The mobile terminal needs to monitor PDCCH for potential retransmission or initial grant at that timing anyway.

Regarding the content of the second SPS UL PDCCH, it could be either a retransmission grant, i.e. a resource assignment for a retransmission, in case the uplink packet according to first SPS UL PDCCH couldn't be decoded correctly at the base station, or a resource allocation for the next initial transmission of a protocol data unit In order to further ensure that a false activation of a semi-persistent resource allocation is avoided, it could be mandated, that the second SPS UL PDCCH, in case of a retransmission grant, indicates a redundancy version rather a transport format info within the TF/MCS field, i.e. one of the three reserved TF/MCS table entries (for details see the co-pending patent application EP 07 024 829.9, "Control Channel Signaling using a Common Signaling Field for Transport Format and Redundancy Version", filed Dec. 20, 2007, incorporated herein by reference or 3GPP Tdoc. R1-081126, slide 5 (for uplink). Otherwise the content of the second SPS UL PDCCH should be same as the first SPS UL PDCCH. The advantage of signaling information on the redundancy version with the second SPS UL PDCCH (retransmission grant) is that in case mobile terminal missed the first SPS UL PDCCH the mobile terminal will not be able to make a retransmission according to the second SPS UL PDCCH, since the mobile terminal has not received any transport format information, i.e. it missed the transport format information signaled with the first SPS UL PDCCH. Consequently the mobile terminal will DTX (discontinued transmission) in this situation, which can be detected by a base station. Furthermore the mobile terminal would be aware that it has missed the first SPS UL PDCCH.

In case the second SPS UL PDCCH is an "initial grant" (i.e. an uplink resource assignment for an initial transmission of a next protocol data unit), its content should be the same as the initial, first SPS UL PDCCH except for the NDI bit, which needs to be toggled in order to indicate a new transmission.

By comparing the content of the two received SPS UL PDCCHs a false activation of a semi-persistent resource allocation can be essentially completely avoided.

In FIG. 6, it is assumed that the initial transmission of the PDU via the PUSCH has not been successful, so that—in parallel to the second SPS UL PDCCH at time instance T1, the base station sends a NACK on the PHICH. Furthermore, transmits the retransmission in a synchronous manner with the TF/MCS and on the uplink resources indicted by the second SPS UL PDCCH. After activation of the semi-persistent scheduling, if a protocol data unit has not been successfully decoded at the base station, the base station sends a negative feedback (NACK) on the PHICH together with a dynamic SPS UL PDCCH (see time instance T2) to schedule the synchronous adaptive retransmission of the protocol data packet or only NACK in case of a non-adaptive retransmission.

In another embodiment, the second PDCCH, confirming the activation of a semi-persistent resource allocation, could be also a dynamic UL PDCCH instead of SPS UL PDCCH, i.e. CRC is masked with dynamic C-RNTI. As described above in order to avoid a false activation of semi-persistent resource allocation the content of the second confirming dynamic PDCCH needs to be the same except for NDI field in case of a initial PDCCH or TF/MCS field in case of a retransmission PDCCH.

Generally, the intention of sending two identical or partially identical PDCCHs is that it is very unlikely that the content of the individual fields that should be identical in the two PDCCHs are indeed identical if the mobile terminal reads random values from one PDCCH that has not been intended for the mobile terminal but passes the CRC check. Accordingly, the mobile terminal receiving the two PDCCHs can compare the content of the fields that should be identical in both PDCCHs, and in case the information of these fields match, it may activate the semi-persistent resource allocation.

According to a further embodiment of the invention is that the mobile terminal can only receive one UL PDCCH, either a dynamic UL PDCCH or a SPS UL PDCCH within a single sub-frame. It may be further defined that a dynamic UL PDCCH has a higher priority than a SPS UL PDCCH. Considering these two assumptions the mobile terminal's PDCCH search/detection procedure could be optimized. In a given sub-frame, the mobile terminal first searches for dynamic UL PDCCHs. In case it detects a dynamic UL PDCCH, i.e. the CRC check with the C-RNTI is successful, the mobile terminal doesn't need to further search for a SPS UL PDCCH. Only in case no dynamic UL PDCCH is found in the sub-frame, the mobile terminal also needs to search/detect for a SPS UL PDCCH masked with the mobile terminal's SPS C-RNTI.

Figure 7:
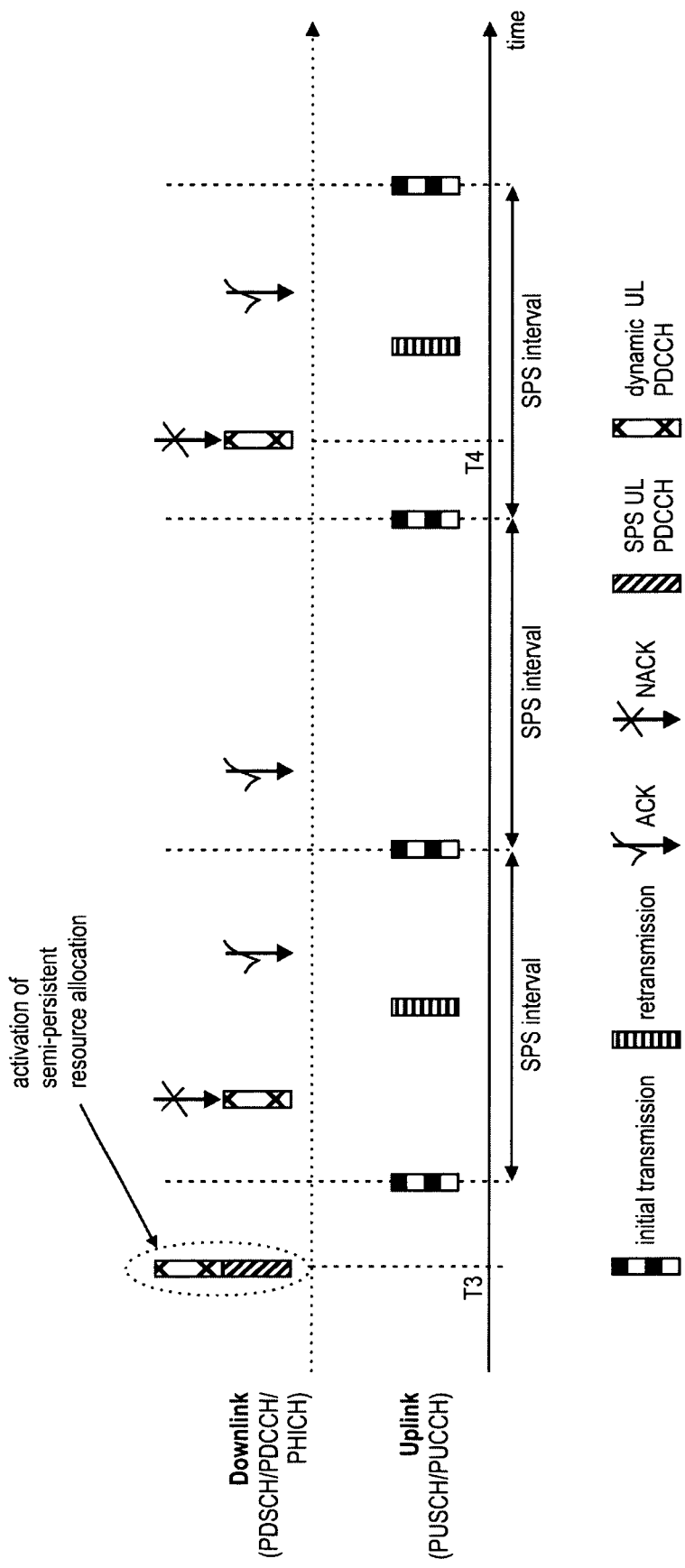
FIG. 7 shows another exemplary signaling procedure for activating an uplink semi-persistent resource allocation according to an exemplary embodiment of the invention.

An alternative embodiment to the one method above is presented in the following. UL semi-persistent scheduling (SPS) is activated by transmitting two UL PDCCHs, for example one UL SPS PDCCH and one UL dynamic PDCCH, in the same sub-frame. This alternative embodiment is shown in FIG. 7 showing a signaling procedure for activating an uplink semi-persistent resource allocation according to this exemplary embodiment of the invention. Essentially, the procedure of FIG. 7 is similar to same in FIG. 6, except for the base station sending a SPS UL PDCCH and a dynamic UL PDCCH at the same time instance T3 within a sub-frame. Only in case mobile terminal receives the two PDCCHs in the same sub-frame it assumes that SPS was activated and acts accordingly, i.e. transmitting every SPS interval according to the received SPS UL PDCCH. After activation of the semi-persistent scheduling, if a protocol data unit has not been successfully decoded at the base station, the base station sends a negative feedback (NACK) on the PHICH together with a dynamic UL PDCCH (see time instance T4) to schedule the synchronous adaptive retransmission of the protocol data packet or only NACK in case of a non-adaptive retransmission.

In case mobile terminal receives within one sub-frame one dynamic PDCCH and one SPS PDCCH, it stores the PDCCH content of the SPS PDCCH and assumes SPS activation. In case only a SPS PDCCH is received within a sub-frame mobile terminal will not follow the grant and DTX, which can be detected by base station. In case of only receiving a dynamic PDCCH, mobile terminal will follow the dynamic grant as in the normal UL HARQ operation. Presumably the content of the two PDCCHs, sent in order to activate SPS, is identical. This will basically make the probability of an false assumed SPS activation impossible.

Following the described mobile terminal behavior with respect to PDCCH reception, it's clear that mobile terminal will never obey a single SPS UL PDCCH. This fact can be advantageously considered in the PDCCH detection procedure. The mobile terminal starts monitoring for a dynamic UL PDCCH. Only in case it detects a dynamic PDCCH (CRC is masked with dynamic C-RNTI) in a given TTI, it needs to further search for an SPS PDCCH. In case no dynamic PDCCH was found in a given TTI, the mobile terminal doesn't need to further search for an SPS PDCCH, hence the PDCCH search/detect procedure could be optimized.

Regarding the base station operation, one issue is that in case base station that has sent the two PDCCHs in order to activate semi-persistent scheduling, cannot offhand distinguish the cases where mobile terminal received only the dynamic UL PDCCH or where mobile terminal received both, SPS UL PDCCH and dynamic UL PDCCH. Hence, the base station cannot clearly detect whether a mobile terminal assumes that a semi-persistent resource allocation has been activated or not. Ideally, both PDCCHs are identical in their content. Hence the mobile terminal's uplink transmission in case of only receiving dynamic UL PDCCH or receiving both PDCCHs would be also the same.

In order to enable base station to detect whether mobile terminal has activated semi-persistent scheduling, the TF/MCS field in the dynamic UL PDCCH could indicate a resource allocation size of zero (i.e. a transport block size (TBS) of zero). All other fields of the dynamic UL PDCCH should be identical to same in the SPS UL PDCCH. In case a mobile terminal receives only the dynamic UL PDCCH with zero size allocation, it will DTX, which can be detected by base station and allows the base station to thereby recognize that the mobile terminal has not activated semi-persistent scheduling.

Generally it should be mentioned that in this embodiment, since both dynamic UL PDCCH and SPS UL PDCCH are sent in the same sub-frame, dynamic UL PDCCH and SPS UL PDCCH are facing the same radio channel conditions (assumption is that there are transmitted in the same frequency region). Therefore there is a high likelihood that either both PDCCHs are received or missed by the mobile terminal.

In another embodiment of the invention which is independent of the detailed semi-persistent resource allocation activation methods discussed before is the introduction of an minimum time span during which no semi-persistent scheduling re(activation) can be done. Basically once semi-persistent scheduling has been activated the base station will not change the configured semi-persistent scheduling parameters, i.e. performing a re(activation), during this predefined time span. The value of the time span could be signaled by the base station to the mobile terminal, when signaling the configuration of the semi-persistent scheduling. For example when base station signals the periodicity of the semi-persistent allocation, it could also include the time value in the message that is indicating a base station is prohibited from reactivating semi-persistent scheduling. The advantage of defining a time period during which no semi-persistent scheduling (re)activation by the base station is possible is that mobile terminal, once having received semi-persistent scheduling activation command, doesn't need to search/monitor for SPS UL PDCCHs. Hence the mobile terminal complexity is reduced during this time.

Examples of mobile communication systems in which the principles of the invention outlined herein may be utilized are communication systems utilizing an OFDM scheme (e.g. AML-OFDM), a MC-CDMA scheme or an OFDM scheme with pulse shaping (OFDM/OQAM).

As has already been indicated above, though the invention has been described referring to uplink data transmissions, it should be noted that the ideas and concept outlined for uplink semi-persistent resource allocation according to the different embodiments and examples above may also be utilized for downlink. Also for downlink data transmissions, the base station transmits a DL PDDCH to the mobile terminals to inform same on the downlink resource assignment, i.e. the radio resources, transport format and potentially timing on which data for the respective (group of) mobile terminals is transmitted on the downlink. Also in this context, semi-persistent resource allocations may be used. According to another embodiment of the invention, related to downlink transmissions, the mobile terminal will activate a semi-persistent resource allocation for downlink transmissions only, if an activation command for activating the downlink semi-persistent resource allocation (e.g. first SPS DL PDDCH) is confirmed (e.g. by a second DL PDCCH).

Similar to the exemplary embodiments of the invention described above for activating semi-persistent scheduling on the uplink, the second DL PDCCH can be a dynamic DL PDDCH (if both PDCCHs are transmitted in the same sub-frame to the mobile terminal) or a SPS DL PDCCH (if the PDCCHs are transmitted in different sub-frames to the mobile terminal).

If using HARQ for the downlink data transmissions, and using two SPS DL PDCCHs for activating the semi-persistent scheduling, the second SPS DL PDCCH may be advantageously transmitted with a time offset of one HARQ RTT relative to the first SPS DL PDCCH.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Furthermore, it should be noted that the terms mobile terminal and mobile station are used as synonyms herein. A user equipment may be considered one example for a mobile station and refers to a mobile terminal for use in 3GPP-based networks, such as LTE.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently discussed by the 3GPP.

The invention claimed is:

1. A method for allocating radio resources to a mobile terminal for uplink transmission in a mobile communication system, the method being performed by a mobile terminal and comprising:
   receiving downlink physical control channel resources, and
   activating a semi-persistent resource allocation only, in the event that the control information of the downlink physical control channel resources comprises two resource assignments for uplink transmission, wherein the two resource assignments are destined to the mobile terminal and indicate an activation of the semi-persistent resource allocation,
   wherein a second resource assignment of the two resource assignments is received with a time offset equal to one Hybrid Automatic Repeat reQuest (HARQ) round-trip time relative to a first resource assignment of the two resource assignments.

2. The method according to claim 1, wherein the two resource assignments each comprise a Cyclic redundancy Check (CRC) field for checking the integrity of the resource assignment, wherein the CRC field is masked with a mobile terminal identifier assigned to the mobile terminal for identification in signaling procedures related to semi-persistent resource allocations.

3. The method according to claim 2, wherein the mobile terminal identifier is a Radio Network Temporary identifier (RNTI) assigned to the mobile terminal for identification in signaling procedures related to semi-persistent resource allocations.

4. The method according to claim 1, wherein the at least two resource assignments are received in different sub-frames.

5. The method according to claim 1, further comprising:
   transmitting, in response to receiving the first resource assignment of the two resource assignments, an initial transmission of an uplink protocol data unit on an uplink shared channel according to the resource allocation using a synchronous Hybrid Automatic Repeat reQuest (HARQ) protocol,
   monitoring the downlink physical control channel resources for a HARQ feedback message for the initial transmission of the protocol data unit and the second resource assignment, and
   receiving on the downlink physical control channel resources the second resource assignment, wherein the second resource assignment is indicating whether the initial transmission of the protocol data unit has been successfully decoded or not and is confirming the activation of the semi-persistent resource allocation.

6. The method according to claim 5, further comprising storing the first resource assignment upon reception, and discarding the stored first resource assignment, in the event that no second resource assignment for activating the semi-persistent resource allocation is received.

7. The method according to claim 5, wherein the second resource assignment is equal in content to the first resource assignment except for indicating a redundancy version for a retransmission of the protocol data unit to be sent by the mobile terminal instead of a transport format of the protocol data unit indicated in the first resource assignment, in the event that the initial transmission of the protocol data unit on the uplink has not been decoded successfully.

8. The method according to claim 5, wherein the second resource assignment is equal in content to the first resource assignment except for a new data indicator comprised in the resource assignments being toggled to indicate a successful decoding of the initial transmission of the protocol data unit, in the event that the initial transmission of the protocol data unit on the uplink has been decoded successfully.

9. The method according to claim 1, wherein receiving the downlink physical control channel resources comprises receiving a sub-frame comprising the two resource assignments for uplink transmission, the first resource assignment being a semi-persistent resource assignment and the second resource assignment being a dynamic resource assignment, and wherein each of the two resource assignments comprises a Cyclic redundancy Check (CRC) field for checking the integrity of the resource assignment.

10. The method according to claim 9, wherein the semi-persistent resource allocation is activated only, in the event that:
    the CRC field of the semi-persistent resource assignment is masked with a mobile terminal identifier assigned to the mobile terminal for identification in signaling procedures related to semi-persistent resource allocations, and
    the CRC field of the dynamic resource assignment is masked with a mobile terminal identifier assigned to the mobile terminal for identification in signaling procedures related to dynamic resource allocations.

11. The method according to claim 9, wherein the semi-persistent resource allocation is activated only, in the event that:
    the CRC field of the semi-persistent resource assignment is masked with a mobile terminal identifier assigned to the mobile terminal for identification in signaling procedures related to semi-persistent resource allocations,
    the CRC field of the dynamic resource assignment is masked with a mobile terminal identifier assigned to the mobile terminal for identification in signaling procedures related to dynamic resource allocations, and
    the information comprised in the semi-persistent and dynamic resource assignment is identical or only differing in the resource allocation size indicated by the respective resource assignment.

12. The method according to claim 9, wherein the resource allocation size indicated in the dynamic resource assignment is set to zero, while the resource allocation size indicated in the semi-persistent resource assignment is indicating the resource allocation size to be used for uplink transmission according to the semi-persistent resource allocation.

13. The method according to claims 9, further comprising transmitting uplink data according to the semi-persistent resource assignment only in the event that both, the semi-persistent resource assignment and dynamic resource assignment are destined to the mobile terminal.

14. The method according to claim 1, wherein the downlink physical control channel resources comprise control information, and the method further comprises:
    checking whether the downlink control information in the sub-frame comprises a dynamic resource assignment dynamically assigning an uplink radio resource to the mobile terminal for uplink transmission, and
    checking whether the downlink control information in the sub-frame comprises a semi-persistent resource assignment for uplink transmissions only in the event that there is a dynamic resource assignment in the control information destined to the mobile terminal.

15. The method according to claim 1, further comprising receiving RRC signaling indicating the periodicity of transmissions to be transmitted according to the semi-persistent resource allocation,
storing resource allocation information of the first and/or second resource assignment, and
transmitting uplink data in accordance with the stored resource allocation information and the periodicity of the semi-persistent resource allocation.

16. A method for allocating radio resources to a mobile terminal for uplink transmission in a mobile communication system, the method comprising the following steps performed by a base station in the radio access network of the mobile communication system:
generating control information for activating a semi-persistent resource allocation of the mobile terminal, wherein the control information comprises two resource assignments for uplink transmission, wherein the two resource assignments are destined to the mobile terminal which is to activate the semi-persistent resource allocation,
mapping the control information to downlink physical control channel resources, and
transmitting the downlink physical control channel resources comprising the control information,
wherein a second resource assignment of the two resource assignments is transmitted with a time offset equal to one Hybrid Automatic Repeat reQuest (HARQ) round-trip time relative to a first resource assignment of the two resource assignments.

17. The method according to claim 16, further comprising:
receiving, in response to receiving the first resource assignment of the two resource assignments, an initial transmission of an uplink protocol data unit on an uplink shared channel according to the resource allocation using a synchronous HARQ protocol, and
transmitting on downlink physical control channel resources a HARQ feedback message for the initial transmission of the protocol data unit, wherein the second resource assignment is indicating whether the initial transmission of the protocol data unit has been successfully decoded by the base station and is confirming the activation of the semi-persistent resource allocation.

18. The method according to claim 16, wherein transmitting the downlink physical control channel resources comprises transmitting in a sub-frame the two resource assignments for uplink transmission, the first resource assignment being a semi-persistent resource assignment and second resource assignment being a dynamic resource assignment, and
detecting whether the mobile terminal has activated the semi-persistent resource allocation by receiving an uplink transmission of a protocol data unit on a radio resource or radio resources allocated to the mobile terminal by the resource assignments.

19. A mobile terminal for use in a mobile communication system, the mobile terminal comprising:
a receiver unit that receives downlink physical control channel resources, and
a processing unit that activates a semi-persistent resource allocation only, in the event that the control information of the downlink physical control channel resources comprises two resource assignments for uplink transmission, wherein the two resource assignments are destined to the mobile terminal and indicate an activation of the semi-persistent resource allocation,
wherein a second resource assignment of the two resource assignments is received with a time offset equal to one Hybrid Automatic Repeat reQuest (HARQ) round-trip time relative to a first resource assignment of the two resource assignments.

20. A base station for use in a radio access system of a mobile communication system, the base station comprising:
a processing unit that generates control information for activating a semi-persistent resource allocation of the mobile terminal, wherein the processing unit is configured to generate control information comprising two resource assignments for uplink transmission, and to destine the resource assignments to a mobile terminal which is to activate the semi-persistent resource allocation,
a mapping unit that maps the control information to downlink physical control channel resources, and
a transmitter unit that transmits the downlink physical control channel resources comprising the control information,
wherein a second resource assignment of the two resource assignments is received with a time offset equal to one Hybrid Automatic Repeat reQuest (HARQ) round-trip time relative to a first resource assignment of the two resource assignments.

* * * * *